(12) United States Patent
Kipnis (10) Patent No.: US 11,440,615 B2
(45) Date of Patent: Sep. 13, 2022

(54) LINEARLY ACTUATED VEHICLE WITH COILING POWER LINK

(71) Applicant: Cyclazoom, LLC, Evanston, IL (US)

(72) Inventor: Michael Kipnis, Wheeling, IL (US)

(73) Assignee: Cyclazoom, LLC, Skokie, IL (US)

( * ) Notice: Subject to any disclaimer, the term of this patent is extended or adjusted under 35 U.S.C. 154(b) by 36 days.

(21) Appl. No.: 17/110,074

(22) Filed: Dec. 2, 2020

(65) Prior Publication Data

US 2021/0086867 A1 Mar. 25, 2021

Related U.S. Application Data

(62) Division of application No. 16/522,865, filed on Jul. 26, 2019, now Pat. No. 10,858,065.

(51) Int. Cl.
*B62M 1/28* (2013.01)
*B62K 3/00* (2006.01)

(52) U.S. Cl.
CPC ............... *B62M 1/28* (2013.01); *B62K 3/005* (2013.01)

(58) Field of Classification Search
CPC . B62M 1/24; B62M 1/28; B62M 1/30; B62K 3/005
See application file for complete search history.

(56) References Cited

U.S. PATENT DOCUMENTS

| 608,674 | A | 8/1898 | Harshner |
| 2,141,967 | A | 12/1938 | Ball, Jr. |
| 3,039,790 | A | 6/1962 | Trott |
| 3,888,334 | A | 6/1975 | Mack |
| 3,954,282 | A | 5/1976 | Hege |
| 4,026,571 | A | 5/1977 | Vereyken |
| 4,077,648 | A | 3/1978 | Seul |
| 4,134,481 | A | 1/1979 | Calderazzo |
| 4,333,664 | A | 6/1982 | Turner et al. |
| 4,456,276 | A | 6/1984 | Bortolin |

(Continued)

FOREIGN PATENT DOCUMENTS

| WO | 2006002577 A1 | 1/2006 |
| WO | 2006059003 A1 | 6/2006 |
| WO | 2017132658 A1 | 8/2017 |

OTHER PUBLICATIONS

Search Report and Written Opinion for International Application No. PCT/US17/015596 dated May 26, 2017.

(Continued)

*Primary Examiner* — Kevin Hurley
(74) *Attorney, Agent, or Firm* — Brian Roffe (57) ABSTRACT

Vehicle including a frame, a seat, a wheel, a drive sprocket arranged on the wheel, a main drive sprocket, a transmission member coupling the drive sprockets, a pedal slider arranged in front of the seat and which swings forward and rearward, and a drive mechanism including an overrunning clutch system connected to the main drive sprocket. A power link is connected at a first end region to the pedal slider and at a second end region to the clutch system. Forward movement of the pedal slider causes movement of the power link and rotation of the clutch system which causes movement of the main drive sprocket and the wheel drive sprocket resulting in rotation of the wheel. The clutch system includes a drum including a groove in which the power link is retained.

20 Claims, 9 Drawing Sheets

(56) References Cited

U.S. PATENT DOCUMENTS

| | | |
|---|---|---|
| 4,574,649 A | 3/1986 | Seol |
| 4,630,839 A | 12/1986 | Seol |
| 4,659,098 A | 4/1987 | Jacobson |
| 4,666,173 A | 5/1987 | Graham |
| 4,846,488 A | 7/1989 | Szadkowski |
| 4,878,684 A | 11/1989 | Lemle |
| 5,035,678 A | 7/1991 | Hageman |
| 5,272,928 A | 12/1993 | Young |
| 5,290,054 A | 3/1994 | Po |
| 5,527,246 A | 6/1996 | Rodgers |
| 5,584,494 A | 12/1996 | Krumm |
| 5,732,963 A | 3/1998 | White |
| 5,915,710 A | 6/1999 | Miller |
| 5,979,922 A | 11/1999 | Becker et al. |
| 6,000,707 A | 12/1999 | Miller |
| 6,007,083 A | 12/1999 | Currie |
| 6,173,981 B1 | 1/2001 | Coleman |
| 6,209,900 B1 | 4/2001 | Yoshizawa |
| 6,237,928 B1 | 5/2001 | Islas |
| 6,336,646 B1 | 1/2002 | Bernardini |
| 6,340,067 B1 | 1/2002 | Fujiwara et al. |
| 6,412,802 B1 | 7/2002 | Kugel et al. |
| 6,730,003 B1 | 5/2004 | Phillips |
| 7,048,290 B2 | 5/2006 | Paquette |
| 7,416,203 B2 | 8/2008 | Tollhurst |
| 7,497,453 B2 | 3/2009 | Fan |
| 7,559,264 B2 | 7/2009 | Qian |
| 7,753,387 B2 | 7/2010 | Wei |
| 8,157,281 B2 | 4/2012 | Wang |
| 8,215,654 B1 | 7/2012 | Leser |
| 8,955,861 B1 | 2/2015 | Rasiah |
| 8,967,022 B2 | 3/2015 | Beard |
| 8,979,107 B2 | 3/2015 | Lin |
| 9,688,349 B2 | 6/2017 | Thompson |
| 10,435,102 B2 | 10/2019 | White |
| 10,858,065 B1 | 12/2020 | Kipnis |
| 2002/0053779 A1 | 5/2002 | Fujiwara et al. |
| 2002/0074788 A1 | 6/2002 | Fujiwara et al. |
| 2003/0122330 A1 | 7/2003 | Nelson |
| 2003/0193160 A1 | 10/2003 | Mehmet |
| 2006/0046884 A1 | 3/2006 | Estergomy |
| 2007/0228687 A1 | 10/2007 | Parker |
| 2010/0089193 A1 | 4/2010 | Martin |
| 2011/0049830 A1 | 3/2011 | Hung |
| 2011/0057411 A1 | 3/2011 | Scolari et al. |
| 2011/0115190 A1 | 5/2011 | McIsaac |
| 2011/0266768 A1 | 11/2011 | Kohlheb et al. |
| 2014/0210179 A1 | 7/2014 | Sprague |
| 2014/0367940 A1 | 12/2014 | Lin |
| 2015/0076787 A1 | 3/2015 | Kipnis |
| 2017/0217536 A1 | 8/2017 | Kipnis |
| 2018/0127052 A1 | 5/2018 | Scarborough |
| 2019/0031280 A1* | 1/2019 | Kipnis .................... B62M 6/00 |

OTHER PUBLICATIONS

Partial Supplementary European Search Eeport for EP 17745075.6 dated Oct. 31, 2019.

* cited by examiner

LINEARLY ACTUATED VEHICLE WITH COILING POWER LINK

FIELD OF THE INVENTION

This invention is generally related to recumbent human-powered vehicles such as bicycles, tricycles and other multi-wheel variants that are propelled by a reciprocating thrust motion of the rider using a linear drive mechanism connected by a flexible power link to an overrunning clutch transmission with returning springs. The human-powered vehicle is propelled with the use of pedals which are positioned approximately above and on either side of the front wheel to create a short wheel base in the human-powered vehicle, with the seat located between the front and rear wheels. The human-powered vehicle may be propelled with the thrust motion of one leg, both legs in an alternating motion such as a typical crank-shaft bicycle, or with the use of both legs simultaneously.

BACKGROUND OF THE INVENTION

Prior art of interest to the field of the invention is as follows:

Recumbent human-powered vehicles such as bicycles and tricycles and human-powered vehicles with linear drivers are known in the prior art. Some examples of such art are found in U.S. Pat. Nos. 4,878,684; 5,979,922; 5,732,963; 5,290,054; 5,915,710; 7,048,290 B2; and WO 2006/002577. Indeed, various bicycle systems and rider positions have been proposed in the art in an effort to provide a rider position that is both comfortable and utilitarian. For example, rectilinear pedal drive systems having two drive chains and an upright rider position are known in the art. Such a system has a separate, vertically-oriented structure mounted to a bicycle frame for supporting and guiding the pedals when in an upright riding position. Recumbent human-powered vehicles with pivotally mounted pedals movable along an arcuate motion have been proposed. Other prior pedal drive systems use interconnected pedals that allow only alternating pedal motion, while other systems allow for both pedals to move forward and rearward together. For reasons provided below, these examples of human-powered vehicles are deficient when compared to the present invention.

U.S. Pat. No. 4,878,684 ("the '684 patent") discloses a recumbent bicycle with a crank transmission, which has certain disadvantages when compared to the present invention, including, for example, lower efficiency, crank kick-backs and crank getting stuck. The recumbent bicycle of the '684 patent has the pedals in front of the seat, with both the seat and pedals being positioned along the frame of the bicycle between the rear and front wheels. Due to this positioning, the '684 patent bicycle has a wheel base that is substantially longer than one of a conventional upright bicycle. The increased length and resultant weight make such a bicycle difficult to maneuver and slower than either conventional bicycles or human-powered vehicles disclosed in the present invention. A shorter wheel base and lighter human powered vehicles are desirable. In addition, as explained below, the crank transmission of the '684 patent provides only about 24% or less muscle efficiency. Such inefficiency is too low, especially for a larger, heavier vehicle described in the '684 patent. To overcome the disadvantages of crank-operated recumbent bicycles such as those described in the '684 patent, it is desirable to utilize linearly reciprocating pedals positioned in front of the front wheel of the human-powered vehicle, as disclosed below.

U.S. Pat. No. 5,979,922 ("the '922 patent") describes a recumbent bicycle with a linear drive mechanism and a partially linearly reciprocating pedal motion; however, when compared to the present invention, the bicycle of the '922 patent has many disadvantages. First, due to the length of the pedal sliders described in the '922 patent, the wheel base of the resulting bicycle is substantially longer than that of a conventional bicycle. Thus, similar to the '684 patent, the bicycle of the '922 patent is both long and heavy, and suffers from the same disadvantages as the '684 patent bicycle. Moreover, the design described in the '922 patent has a potential problem with stability and requires retractable stabilizer wheels, which make this design dangerous and impractical for most riders. Indeed, the aforementioned disadvantages are typical of most recumbent bicycles known in the art. The presently described invention addresses this known problem, among others, with a wheel base potentially equal to or only slightly longer than a conventional upright bicycle. Such a design, coupled with the novel drive mechanism proposed herein, eliminates one or more of the problems associated with a long wheel base. Second, the recumbent bicycle of the '922 patent does not allow for independent pedal motion wherein the rider chooses simultaneous or alternating pedal motion, which may be powered by a rider having only one leg. Finally, the '922 patent lacks in power efficiency provided with the use of the novel linear drive mechanism connected by a flexible power link to a double overrunning clutch transmission with returning springs.

U.S. Pat. Appln. Publ. No. 20150076787 (Kipnis) describes a recumbent human-powered vehicle is propelled by a reciprocating thrust motion using a linear drive mechanism connected by flexible power links to a double overrunning clutch transmission with returning springs. The vehicle has a wheel base approximately that of a conventional upright bicycle and does not utilize a crank transmission. The vehicle may be propelled with alternating, single or simultaneous leg motion with the use of pedal sliders positioned for independent pendulum-type oscillation. The linearly reciprocating pedals are rotationally linked to the transmission portion of the linear drive mechanism through a pair of flexible power links so as to transfer power from the pedals to the transmission, which includes a pair of overrunning clutches connected to the main chain axis allowing to transmit the moving force to the main chain axis. The overrunning clutches return back to idle mode with the use of returning springs.

Additional prior art references accumulate many of the problems described above. These include U.S. Pat. Nos. 4,574,649, 4,846,488, 5,272,928, 5,290,054 5,732,963, 5,915,710, 6,173,981, and 7,048,290.

Therefore, a need in the art exists for an efficient recumbent human-powered vehicle with a wheel base approximately that of a conventional upright bicycle, low weight and convenient seating and steering, and that may be operated with a simultaneous thrust motion of both legs, alternative thrusts of either leg, or with one leg only. A further need in the art exists for a human-powered vehicle as an alternative to automobiles and other forms of transit. The present invention fulfills these and other needs by providing, as one embodiment, a short wheel base recumbent human-powered vehicle propelled by a reciprocating thrust motion of the operator using a linear drive mechanism connected by a flexible power link to a double overrunning clutch transmission with returning springs.

OBJECTS AND SUMMARY OF THE INVENTION

An object of at least one embodiment of the present invention is to provide a recumbent human-powered vehicle propelled by a reciprocating thrust motion of the operator using a linear drive mechanism connected by flexible power links to a double overrunning clutch transmission with returning springs. The human-powered vehicle is propelled with the use of pedals, which are positioned approximately above and on either side of the front wheel to create a short wheel base, approximately the same or slightly larger than that of a conventional upright bicycle, with the seat located between the front and rear wheels.

The human-powered vehicle generally comprises a frame supporting a rider in a substantially recumbent position, a driven wheel rotatably mounted on the frame, a drive gear for driving the driven wheel, left and right pedals mounted on the front of the frame in front of the steering column, with the right and left pedals reciprocally traveling in a substantially horizontal rectilinear path. The top extremities of a pair of pedal sliders are positioned for independent pendulum-type oscillation (swinging forward and backward) in a pedal-slider bracket, which is connected to a frame through a front bracket. The linearly reciprocating pedals are attached to the lower extremity of the pedals sliders and are rotationally linked to the linear drive mechanism through a pair of flexible power links such as chains or flexible cords so as to transfer power from the pedals to the drive mechanism.

Rollers are arranged on the frame to guide the power links, each in a substantially horizontal plane in a portion between the roller and the respective pedal slider.

The linear drive mechanism is located between the wheels, and the recumbent seat is located on the beam in front of or between the rear wheel(s) and the steering column. The drive mechanism is connected to the vehicle main chain axis drive/transmission, which is connected to the frame and includes a pair of sprocket wheels connected a pair of overrunning clutches allowing transmission of the moving force to the main chain axis and returning back as overrunning clutches in idle mode.

Each overrunning clutch includes a drum fixed to an outer ring with one end region of the power link being connected to the drum and the other end region being connected to the respective pedal slider. Each drum includes a groove in which the power link coils over itself. By coiling over itself, the power link is able to provide variable degrees of force transmission dependent on a vertical location at which the power links separates form the drum.

To return the flexible power links and pedals back to a working position, the flexible power links are connected to a pair of springs, which are connected to the vehicle frame. For example, the flexible power links may be returned to original or working position by spiral torsion springs, which are also connected to the flexible power links and the vehicle frame. The pedals execute a back-and-forth motion between a fully extended and a contracted position. Unlike other recumbent human-powered vehicles, the present invention does not utilize a crank transmission and may be propelled with the thrust motion of one leg, both legs in an alternating motion such as a typical bicycle using a crank mechanism, or with the use of both legs simultaneously.

The human-powered vehicle of the present invention has a very efficient power transfer to the wheels, thereby increasing the speed of the vehicle as compared to typical recumbent bicycles and tricycles, permitting a greater speed and distance of travel, and allowing to carry additional weight, such as, for example, extra passengers. Typical crank-operated human-powered vehicles such as bicycles and tricycles are capable of only 24% muscle efficiency as compared to the novel linear drive and double-overrunning clutch transmission utilized in the present invention, which use approximately 90% or higher muscle efficiency. The increased efficiency, relatively lighter weight, comfort and ease of steering of the human-powered vehicle described herein, make it as an alternative to fuel-consuming vehicles for local travel and transport of lighter weight loads.

A particular feature of the recumbent position and frame of the vehicle described herein is a riding position that, compared with the upright seated position, affords more efficient and comfortable propulsion, where muscle stress may be more readily alternated among muscles groups of both the front and back of the body. The recumbent position of the seat in the present invention offers additional medical benefits that are well-known and described in the art of recumbent cycling, such as, for example, decreased pressure on the groin area.

Due to the relatively short wheel base of embodiments of a bicycle in accordance with the present invention and its unique linear drive transmission, the human-powered vehicle of the present invention is generally capable of attaining speeds substantially higher than those of conventional crankshaft-operated recumbent bicycles and tricycles. The combination of the design with a short wheel base and the linear drive mechanism described herein also permits the user of the vehicle to propel heavier loads, such as additional passengers, groceries, and other weight.

Further objects and advantages of this invention will become apparent from a consideration of the included figures with corresponding description.

BRIEF DESCRIPTION OF THE DRAWINGS

The invention, together with further advantages thereof, may best be understood by reference to the following description taken in conjunction with the accompanying drawings, wherein like reference numerals identify like elements, and wherein.

DETAILED DESCRIPTION OF THE INVENTION

Figure 1:
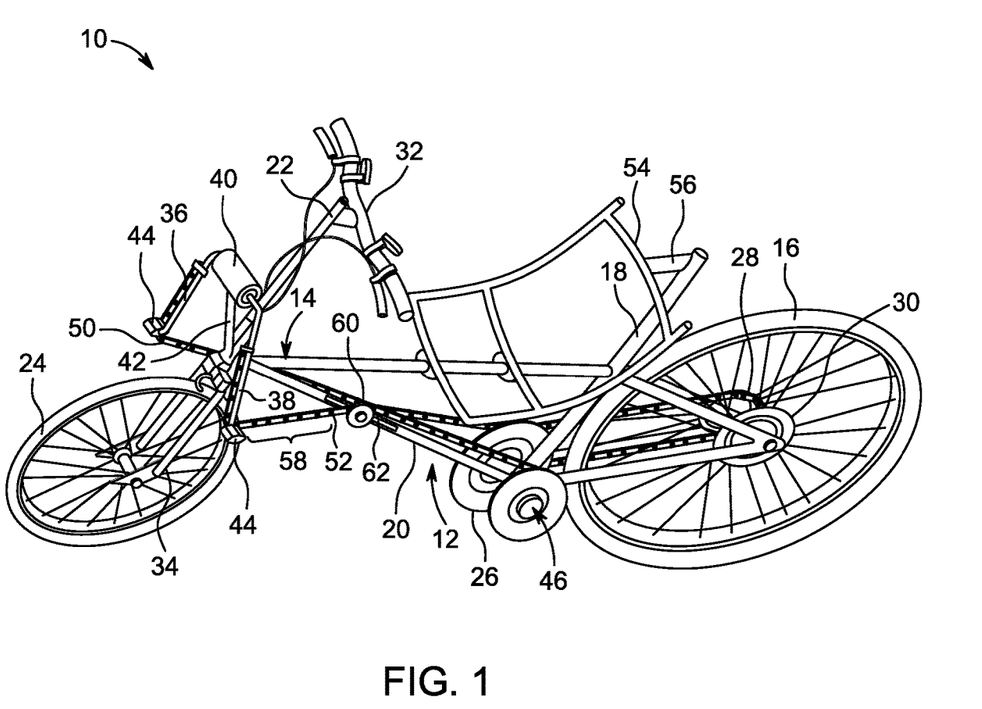
FIG. 1 is a perspective view of an embodiment of the present invention.

Referring to the accompanying drawings wherein the same reference numbers refer to the same or similar elements, FIG. 1 shows a recumbent bicycle 10 in accordance with the invention having a double-stroke linear drive mechanism 12 integral with a bicycle frame 14 (the double-stroke linear drive mechanism 12 is also simply referred to as a drive mechanism herein). The recumbent bicycle 10 has many of the standard components found in typical bicycles, such as a rear wheel 16, top tube 18, lower tube 20, steering column 22, front wheel 24, main drive sprocket 26, main drive chain 28, rear wheel drive sprocket 30, adjustable handlebar 32, and front fork 34. Bicycle 10 may include alternative or other components known to be used on bicycles as long as they do not interfere with the mechanism 12. The main drive chain 28 serves as a transmission member that couples the rear wheel drive sprocket 30 to the main drive sprocket 26 so that upon rotation of the main drive sprocket 26, the main drive chain 28 moves and such movement causes rotation of the wheel drive sprocket 30 and thus rotation of the rear wheel 16. The main drive sprocket 26 is also referred to as a main drive sprocket plate herein.

Figure 15:
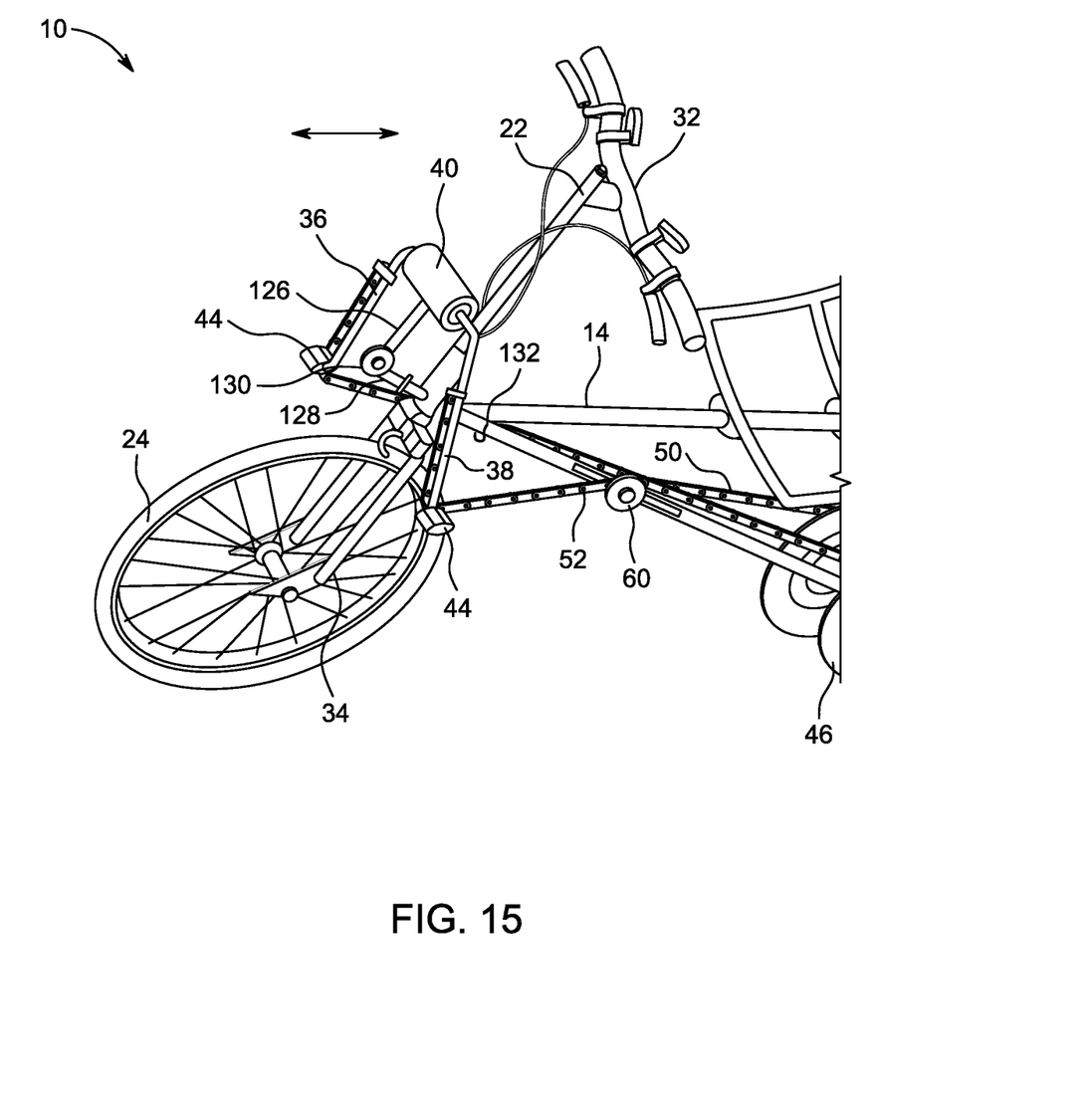
FIG. 15 is a perspective view of a front of a modified embodiment of a vehicle in accordance with the invention.

Bicycle 10 is provided with a right pedal slider 36 and left pedal slider 38, with upper ends of the pedal sliders 36 and 38 joined to a pedal slider bracket 40 of a pedal slider bracket holder 42 of the frame 14 to create a pendulum-type oscillation movement (with the pedal sliders 36, 38 being independently swingable). A respective pedal 44 is attached to the lower end of each of the pedal sliders 36 and 38. Bracket holder 42 serves to provide a fixed pivot axis about which the pedal sliders 36, 38 swing. It may be part of the frame 14 or a separate part and then attached to the frame 14. An alternative bracket holder 42 is shown in FIG. 15, and provides for an adjustment in the position of the bracket holder 42, and thus the pedal slider bracket 40. Either the right pedal slider 36 or the left pedal slider 38 may be considered a first pedal slider and the other a second pedal slider.

Drive mechanism 12 includes an overrunning clutch system 46 (also referred to simply as a clutch system herein), which is positioned for rotation in connection with a transmission bracket 48 mounted on the frame 14. A right power link 50 and a left power link 52 are each attached to the lower end of the respective one of the pedal sliders 36 and 38. Either the right power link 50 or the left power link 52 may be considered a first power link and the other a second power link The power links 50, 52 are attached at a first or forward end region to the lower end of the respective one of the pedal sliders 36, 38, and at a second or rearward end region to the overrunning clutch system 46.

Seat 54 of the recumbent bicycle 10 is adjustably attached to frame 14 and to the top tube 18 and has an adjustable seat support rod 56. Only the frame of the seat 54 is shown to enable visualization of parts of the bicycle 10 below the seat 54, but it should be understood that the set 54 has cushioned areas and other structure like a typical bicycle seat.

Although in a preferred embodiment of the invention, the seat 54 is configured to be in a substantially recumbent position, this position need not be completely horizontal in relation to the top tube 18, the pedals 44 and clutch system 46. A rider positioned below or above the horizontal plane defined by the clutch system 46 may also work with the human-powered bicycle 10. In certain embodiments, it may be beneficial to raise the seat 54 above a plane defined by the clutch system 46 for better visibility of the bicycle operator.

It is beneficial if the power links 50, 52 run in a horizontal plane at least in a portion 58 adjacent to the pedal sliders 36, 38. By configuring the power links 50, 52 in this manner, the transmission of force by the rider pushing the pedals 44 forward is maximized since there is no loss, or minimal loss, as a result of a vertical force component. Rather, pushing movement of the rider of the pedals 44 and the associated pedal sliders 36, 38 causes substantially the entire pushing force of the rider to be converted into a horizontally directed force that pulls the power links 50, 52 forward in the horizontal direction, causing them to move entirely in a horizontal plane (in that portion 58 adjacent to the pedal sliders 36, 38).

To cause the power links 50, 52 to be in the horizontal plane in the portion 58, a roller 60 is attached to the lower tube 20 at a certain height on each side of the lower tube 20. There is thus one roller 60 for the right power link 50 and one roller 60 for the left power link 52. The height of the rollers 60 is determined when manufacturing or assembling the bicycle 10 to be in the same horizontal plane as the lower end of the pedal sliders 36, 38 (or more specifically, that location at which the power links 50, 52 attach to the respective pedal sliders 36, 38).

In some embodiments, the pedal sliders 36, 38 may be adjustable to different heights to accommodate different riders by means of an adjustable system, details of which are provided below. In this case, the rollers 60 are mounted on a displacement device 62 to enable them to slide up and down along the lower tube 20. The specific construction of the displacement device 62 can be a variety of different constructions. For example, the lower tube 20 may include apertures spaced apart from one another and the rollers 60 releasably connected to one another via a pin that extends through one of the apertures (the pin and apertures thus constituting the displacement device 62). The rider then releases one of the rollers 60 to expose the pin and places the pin through an aperture fitting their riding position and then reattaches the other roller 60, fixing the rollers 60 in place.

Other displacement structure may be a bracket placed along each side of the lower tube 20 and a complementary slider attached to the each roller 60. The rider slides the roller 60 along the bracket to the desired riding position and then fixes the rollers 60 in place. Other constructions to provide for an adjustable or displaceable roller 60 are also contemplated to be within the scope of the invention. Generally, such structure is referred to as roller displacement means. These means enable movement of the roller 60 along the lower tube 20 in a preparatory stage while also fixing the rollers 60 in place in a use state.

Each roller 60 is structure to provided a channel or groove through which the respective power link 50, 52 passes (see FIGS. 8-11). Ideally, the roller 60 should be designed to provide near frictionless passage of the power link 50, 52 over it. The depth of the channel or groove in the rollers 60 should be sufficient to prevent the power links 50, 52 from inadvertently falling out of the channel or groove. Rollers 60 may be considered like pulleys.

In the portion of the power link 50, 52 rearward of the rollers 60, the power links 50, 52 have a linear path, but not in a horizontal plane. Rather, the power links 50, 52 are in a plane between the outlet location from the respective roller 60 and the inlet location to the clutch system 46.

Accordingly, the bicycle 10 has a specific reason for the placement of a roller on a path of each of the power links 50, 52, additional to causing a change in the plane in which the power links 50, 52 run. Specifically, the rollers 60 are positioned to cause a specific orientation of the plane in which the power links 50, 52 are situated forward of the rollers 60 to be substantially horizontal, with the forward end region of the power links 50, 52 in the portion 58 attaching to the pedal sliders 36, 38 and the rearward end region of the power links 50, 52 in the portion 58 running over the rollers 60. By substantially horizontal, it is meant that the deviation from the horizontal plane is no more than about 5 degrees. As such, rollers 60 are directional rollers which change the running direction or place of the power links 50, 52. With this orientation (horizontal forward of the roller and angled rearward of the roller), the rider-caused forwarding movement of the pedals 44 is optimally converted into a maximal horizontal force pulling the power links 50, 52 forward. Additionally, the rider is better able to push the pedals 44 forward in the horizontal direction since there is no vertical force component dragging on the forwarding pushing movement of the pedals 44.

Optionally, the lower end of the pedal sliders 36, 38 may be adjustable to improve the positioning of the portion 58 in a horizontal plane. To this end, each pedal slider 36, 38 may have a small roller, not shown, mounted in a track or bracket, also not shown, that is longitudinally extendible, i.e., extends up and down along the pedal slider 36, 38. The track or bracket can be locked in position by a screw or other structure known to those skilled in the art. The user then can individually adjust the orientation of the portion 58 of the power link 50, 52 to be in a horizontal plane by adjusting one or both of the forward end of portion 58 retained on the pedal slider 36, 38 (via the movable track or bracket having the roller thereon) and the rearward end running over the roller 60 (via adjustment of the longitudinal position of the roller 60). The bicycle 10 therefore includes adjustment means for adjusting the planar orientation of a portion 58 of the power link 50, 52 between the pedal slider 36, 38 and the respective roller 60 by adjusting the height of the power link 50, 52 at only one end or both ends of the portion 58 between the pedal slider 36, 38 and the respective roller 60.

Figure 2:
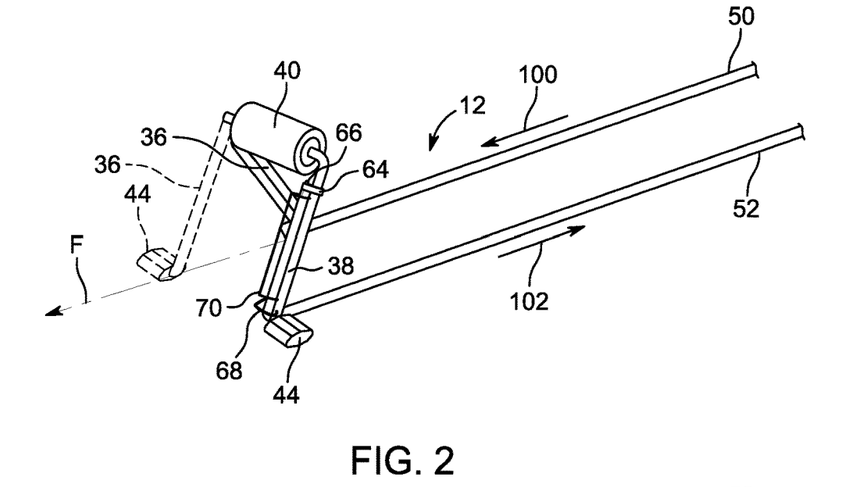
FIG. 2 is a perspective view of the linear drive mechanism and a particular embodiment of the flexible power link, namely, a vinyl-coated metal cord, used in the present invention.

FIG. 2 is a perspective view of part of the linear drive mechanism 12 in which a vinyl-coated metal cord is used for each of the power links 50, 52. Each power link 50, 52 is attached to the respective pedal slider 36, 38 by a clamp 64 at a height along the pedal slider 36, 38. For the ease of description, an explanation of the manner in which one of the power links 50, 52, power link 52, is attached to the pedal slider 38 will be explained, but the other power link 50 is attached to the pedal slider 36 in the same manner.

The end 66 of the power link 52 is clamped by clamp 64 at a location between the bottom end region and the upper end region of the pedal slider 38. The exact height depends on the manner in which the rider wants to use the bicycle, explained below, since there is a difference in the conversion of force into movement relative to the attachment point of the power link 52 to the pedal slider 38.

Structure is provided on the pedal slider 38 to retain the power link 52 in connection therewith below the location at which it is clamped to the pedal slider 38 by the clamp 64. This structure may include, for example, a loop or hook 68 arranged at the lower end of the pedal slider 38 and through which the power link 52 passes, and/or a bracket 70 along the pedal slider 38 with a groove into which the power link 52 is placed. The objective of this structure is to ensure that the clamp 64 retains the power link 52 in connection with the pedal slider 38 and also cause the power link 52 to separate from the pedal slider 38 at its lower end and allow the power link 52 to be oriented in a horizontal plane between the lower end of the pedal slider 38 and the roller 60.

By securing a portion of the power links 50, 52 to the respective pedal slider 36, 38, a more secure attachment of the power links 50, 52 to the pedal sliders 36, 38 is achieved. This reduces potential breakage of the drive mechanism 12 of the bicycle 10 during use.

Figure 3:
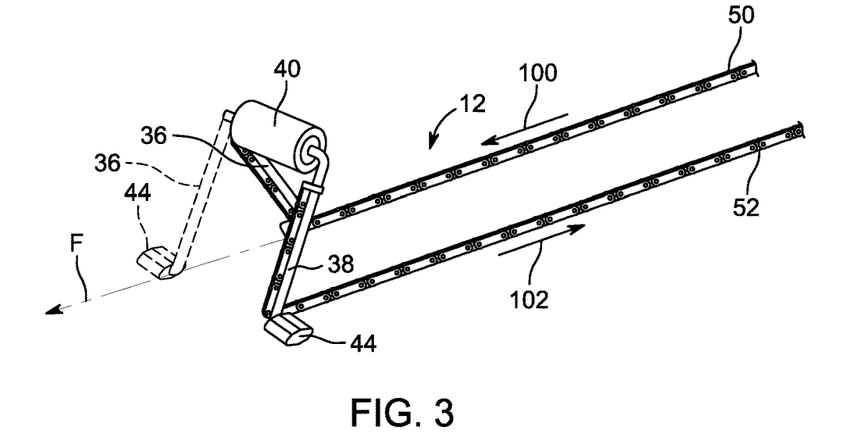
FIG. 3 is a perspective view of the linear drive mechanism and a particular embodiment of the flexible power link, namely, a metal chain, used in the present invention.

FIG. 3 is a perspective view of part of the linear drive mechanism 12 in which a metal chain is used for each of the power links 50, 52. In other respects, the embodiment of FIG. 3 is the same as the embodiment of FIG. 2.

Figure 4:
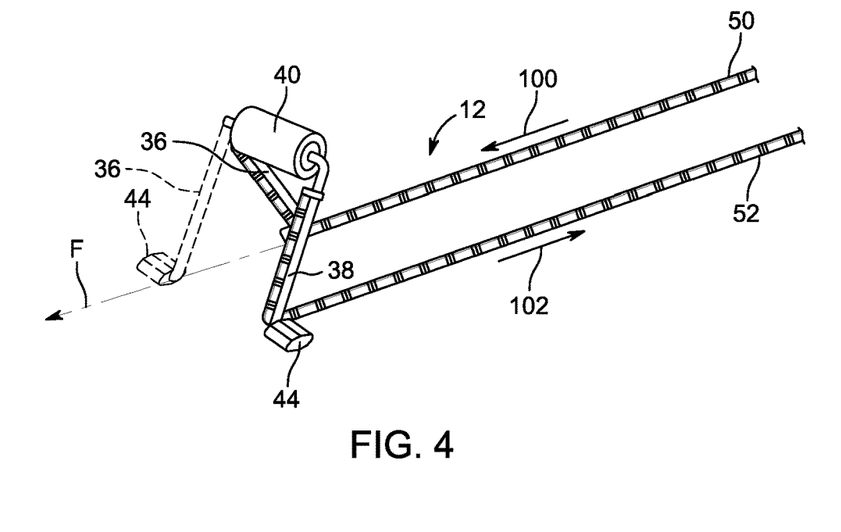
FIG. 4 is a perspective view of the linear drive mechanism and a particular embodiment of the flexible power link, namely, a belt, used in the present invention.

FIG. 4 is a perspective view of part of the linear drive mechanism 12 in which a belt is used for each of the power links 50, 52. In other respects, the embodiment of FIG. 4 is the same as the embodiment of FIG. 2. The belt may be like a car timing belt or another type of belt.

Although the power links 50, 52 are described as being a metal cord, metal chain or belt, FIGS. 2, 3 and 4, respectively, they may be other equivalent or comparable structures that can transfer force along their length. It is also possible to use different type of power links 50, 52 on the same bicycle 10. Thus, while the present invention provides three specific examples of flexible power links, i.e., vinyl-coated metal cords, metal chains and belts, the flexible power links 50, 52 may also be made out of any number of materials suitable to the typical stresses experienced with the use of the linear drive mechanism 46 of the present invention.

Figure 5:
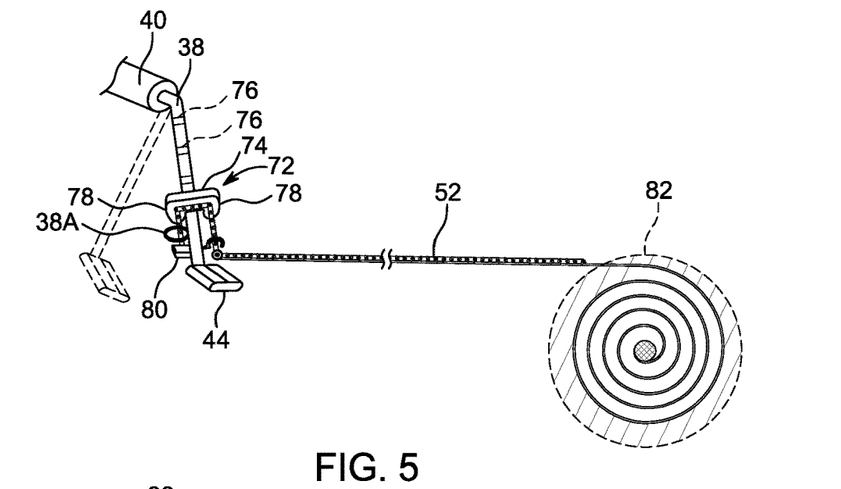
FIGS. 5, 6 and 7 enable explanation of a difference in operation of the linear drive mechanism of the invention.
Figure 6:
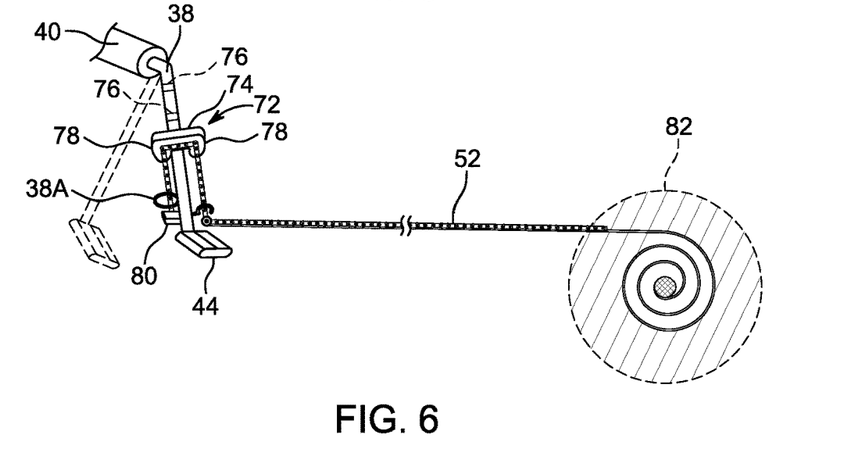
Figure 7:
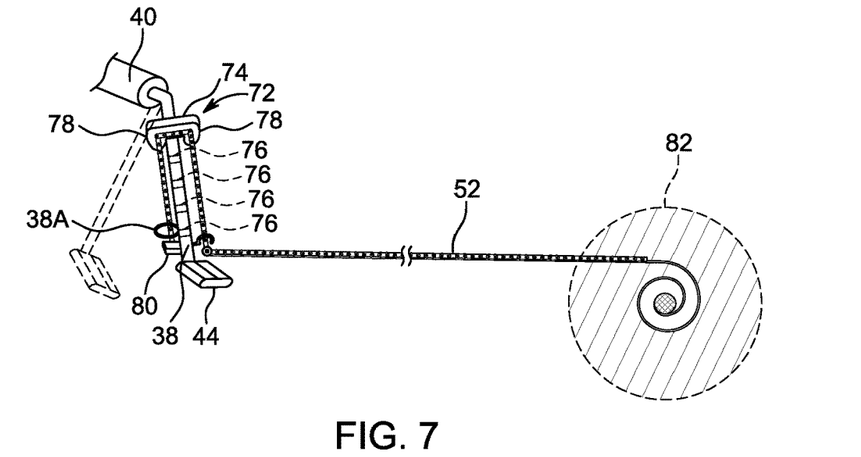

FIGS. 5, 6 and 7 enable an explanation of the effect of the attachment of the power links 50, 52 to the pedal sliders 36, 38, respectively, at different heights. For the ease of description, an explanation of the manner in which one of the power links 52 is attached to the pedal slider 38 will be explained, but the other power link 50 is attached to the pedal slider 36 in the same manner.

Initially, FIGS. 5-7 shows use of a specific type of clamping structure 72 which has one portion 74 that passes through a respective one of a plurality of apertures 76 in the pedal slider 36 and two retaining portions 78. Clamping structure 72 may be any known type of adjustable clamping device that retains a strap while preventing its movement through the structure. Such devices are common in various fields, e.g., camping, mountain climbing.

Generally, the clamping structure 72 is a movable fixator or fixation means in that it fixes the power link 52 in one a plurality of different positions along the longitudinal length of the pedal slider 52 so that it cannot move relative to the fixator and also fixes the power link 52 to the pedal slider 38 to ensure that movement of the pedal slider 38 results in movement of the power link 52. Various different forms of a fixator may be used, which are known to those skilled in the field of straps and the like.

In the invention, the clamping structure 72 is used to retain the power link 52 while also engaging with the pedal slider 38 via one of the apertures 76. Also, the end of the power link 52 may be attached to the pedal slider 38 by providing a peg 80 at the end of the power link 52 and fitting the peg 80 into a corresponding aperture in the pedal slider 38. Peg 80 represents an anchor that anchors the end of the power link 52 to the pedal slider 38. Instead of a peg 80, any other type of structure that serves this purpose, i.e., anchoring the end of the power link 52 to the pedal slider 38, may be used in accordance with the invention without deviating from the scope and spirit thereof, e.g., a cooperating snap structure on each of the end of the power link 52 and the pedal slider 38, a magnet on one of the end of the power link 52 and the pedal slider 38 (with the other one having a metal portion at the appropriate location(s)). The peg 80 and comparable structure may be considered anchor means for anchoring an end of the power link 52 to the pedal slider 38.

Structure is provided on the pedal slider 38 to retain the power link 52 in connection therewith along the rearward edge. This structure may include, for example, a loop or hook 38A arranged at the lower end of the pedal slider 38 and through which the power link 52 passes, and/or a bracket along the rear side of the pedal slider 38 with a groove into which the power link 52 is placed (see FIG. 2). An objective of this structure is to ensure that the power link 52 is retained in connection with the pedal slider 38 and also cause the power link 52 to separate from the pedal slider 38 at its lower end and allow the power link 52 to be oriented in a horizontal plane between the lower end of the pedal slider 36 and the roller 60 (see the discussion above). The loop or hook 38A therefore represents any type of directional device that changes the direction of the power link 52 from a vertically oriented run alongside the pedal slider 52 to a horizontal run in portion 58.

FIG. 5 shows the power link 52 attached to the pedal slider 38 via the clamping structure 72 in a lowermost position. In this position, the least amount of power link 52 is around the pedal slider 38 and the largest amount of the power link 52 is coiled around a drum 82 of the mechanism 46. Since the maximum horizontal movement of the pedal 44 in the forward direction is limited when the rider pushes the pedal 44 connected to the pedal slider 38, the power link 52 will unwind from the drum 82 requiring an easy forward stroke, but not providing significant rotational force.

FIG. 7 shows the power link 52 attached to the pedal slider 52 via the clamping structure 72 in an uppermost position. In this position, the largest amount of power link 52 is around the pedal slider 52 and the least amount of the power link 52 is coiled around the drum 82. Since the maximum horizontal movement of the pedal 44 in the forward direction is limited when the rider pushes the pedal 44 connected to the pedal slider 38, the power link 52 will unwind from the drum 82 requiring a forceful forward stroke, while providing significant rotational force.

FIG. 6 shows the power link 52 attached to the pedal slider 38 via the clamping structure 72 in one of the intermediate positions. In this position, an intermediate amount of power link 52 is around the pedal slider 38 and an intermediate amount of the power link 52 is coiled around the drum 82. Since the maximum horizontal movement of the pedal 44 in the forward direction is limited when the rider pushes the pedal 44 connected to the pedal slider 38, the power link 52 will unwind from the drum 82 requiring an average force forward stroke, while providing an average rotational force.

A rider can adjust the clamping structure 72 depending on their desired ride. Adjustment of the clamping structure 72 requires the rider to remove the portion 74 from an aperture 76 in the pedal slider 38, adjust the power link 52 and then re-attach the clamping structure 72 to the pedal slider 38 in the new, desired position by inserting the portion 74 into the appropriate aperture 76.

Figure 8:
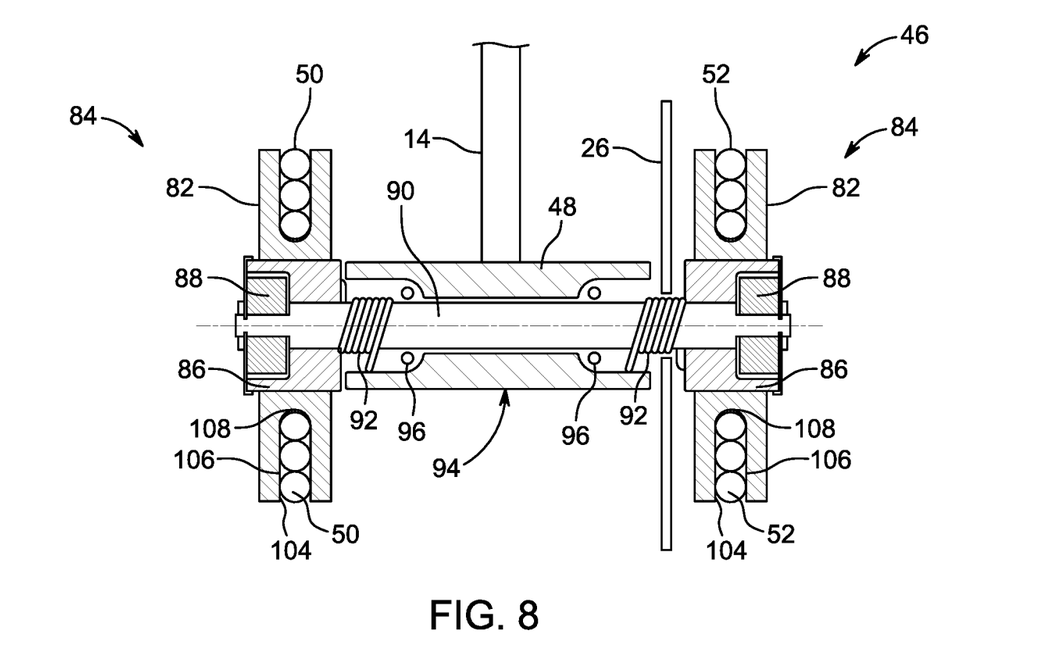
FIG. 8 is a cross-sectional view of a first embodiment of the transmission of the present invention (utilizing drums and a vinyl-coated metal cord as a flexible power link).

Referring to FIG. 8, the double stroke linear drive mechanism 12 includes the clutch system 46 and the flexible power links 50 and 52. The flexible power links 50 and 52 may be made of any flexible material such as, for example, vinyl-coated metal cord (FIG. 2) or metal chain (FIG. 3).

Clutch system 46 includes two overrunning clutches 84 mounted to a common transmission axle 90, the general design of overrunning clutches being known to those skilled in the transmission field. In the illustrated embodiment, each overrunning clutch 84 has outer and inner rings 86 and 88. In each of the overrunning clutches 84, one of the outer ring 86 and the inner ring may be considered a first ring and the other considered a second ring. Rings 86, 88 are alternatively considered or termed races or gears, or other comparable terminology used by those in the transmission field. The drum 82 is connected to a respective outer ring 86. The power links 50, 52 are each connected to a respective drum 82. Outer and inner rings 86, 88 are configured such that when outer ring 86 rotates in one direction, the inner ring 88 is engaged with the outer ring 86 and rotates as well in the same direction. However, when outer ring 86 rotates in the opposite direction, the inner ring 88 is disengaged with the outer ring 86 and does not rotate. The direction of rotation of the outer ring 86 varies depending on the side of the bicycle 10. The outer and inner rings 86, 88 on the left side of the bicycle 10 are engaged when the outer ring 86 rotates counterclockwise (when viewed from the left side of the bicycle 10) and outer and inner rings 86, 88 on the right side of the bicycle 10 are engaged when the outer ring 86 rotates clockwise (when viewed from the right side of the bicycle 10). One overrunning clutch 84 is thus on the right side of the bicycle 10 and another is on the left side of the bicycle 10, and either of these overrunning clutches may be considered a first overrunning clutch and the other a second overrunning clutch.

Rotation of the inner ring 88 is transmitted to the rear wheel 16 via the main drive sprocket plate 26 which is fixed to the transmission axle 90 to which the inner ring 88 is fixed, and a drive chain 24 that passes around the outer periphery of the main drive sprocket plate 26.

Rotation of the outer ring 86 is caused by pulling of the power link 50, 52, which causes the respective drum 82 to rotate and thus the outer ring 86 to rotate in view of its fixing to the drum 82 (see FIG. 8).

Biasing members, such as spiral torsional springs 92, are provided to cause the reverse rotation of the outer ring 86.

Additional features of the drive mechanism 12 includes a transmission main chain axis drive 94 having the transmission axle 90 located in the transmission bracket 48 and bearings 96 between an inner surface of the transmission bracket 48 and an outer surface of the transmission axle 90 to enable rotation of transmission axle 90 relative to the transmission bracket 48. Overrunning clutches 84 are thus installed on the elongate transmission axle 90, allowing drums 82 to freely rotate when no pedaling occurs. Overrunning clutches 84 engage the transmission when pedaling occurs to induce rotation of the main drive sprocket plate 26, which is rigidly connected to the transmission axle 90. The main drive sprocket plate 26 acts like a standard forward sprocket wheel on a standard bicycle.

To return drums 82 to a working position, flexible power links 50, 52 perform idle motion on a return stroke cycle 100 (see FIGS. 2, 3 and 4), as the spiral torsion return spring 92 rotates the outer ring 86 of the overrunning clutch 84 (connected to drum 82) in the opposite direction. Then, the outer ring 86 performs a power stroke cycle 102 (see FIGS. 2 and 3) when drum 82 rotates the overrunning clutch outer ring 86 engaged with the inner ring 88 of the overrunning clutch 84 and transmits the rotation to transmission axle 90, the main drive sprocket plate 26 and the main drive chain 28. At the same time, the overrunning clutch inner ring 88 compresses the spiral torsion returning spring 92. This sequence repeats itself as the rider moves the pedals forward and backward, power stroke, return stroke, power stroke, return stroke, etc.

As known to those skilled in the art, as the outer ring 86 rotates, the main drive sprocket plate 26 rotates causing the main drive chain 28 that is threaded over it to move and the rear wheel drive sprocket 30, over which the main drive chain 28 is also threaded, to rotate thereby causing rotation of the rear wheel 16 to which the rear wheel drive sprocket 30 is connected (see FIG. 1). Thus, in the power or motive stroke, the outer ring 86 is in engagement with the inner ring 88, while in the return stroke, the outer ring 86 is not in engagement with the inner ring 88. Also, FIG. 8 clearly shows that there are two overrunning clutches 84 in the clutch system 46 of the drive mechanism 12, one on each side of the frame 14.

The overrunning clutch 84 of the clutch system 46 on each side of the frame 14 is shown. The drum 82 of each overrunning clutch 84 has an opening in which at least a part of the outer ring 86 and at least a part of the inner ring 88 are situated. The inner ring 88 is housed in a cavity in the outer ring 86. The outer ring 86 extends inward toward the frame 14 while the inner ring 88 is mostly housed in a space defined by the outer ring 86. The single main drive sprocket plate 26 is between the transmission bracket 48 that is fixed to the frame 14, and the inner ring 88 on one side of the transmission bracket 48.

The left and right power stroke/return cycles 100, 102 are independent from one another. Because of this independent action, the rider can use both legs simultaneously when necessary to provide more power to the bicycle 10, such as, for example, when accelerating, riding uphill or carrying larger loads (e.g., passengers in a rickshaw-like configuration). Likewise, the rider may alternate between left and right leg motion such as used in a typical upright or recumbent bicycle. Finally, the bicycle 10 may be propelled with the use of either the right or left leg in a single-stroke action.

Each power link 50, 52 interacts with the respective drum 82 in a manner to improve the transmission of force from the power link 50, 52 to the drum 82, and in turn to the transmission axle 90. Specifically, in the embodiment of FIG. 8 wherein the power link 50, 52 is a cord having a substantially circular cross-section, each drum 82 is provided with a deep groove 104 having a width the same as or only slightly larger than the width of the power link 50, 52 and a curved bottom surface 106. As such, the power link 50, 52 is forced by the inner wall 108 of the groove 104 to coil vertically in the groove 104. The end of the power link 50, 52 is fixed to the drum 82 at a bottom of the groove 104 (seen in FIGS. 5-7). This vertical coiling of the power link 50, 52 enables the variability in the force conversion discussed above with reference to FIGS. 5-7.

Figure 9:
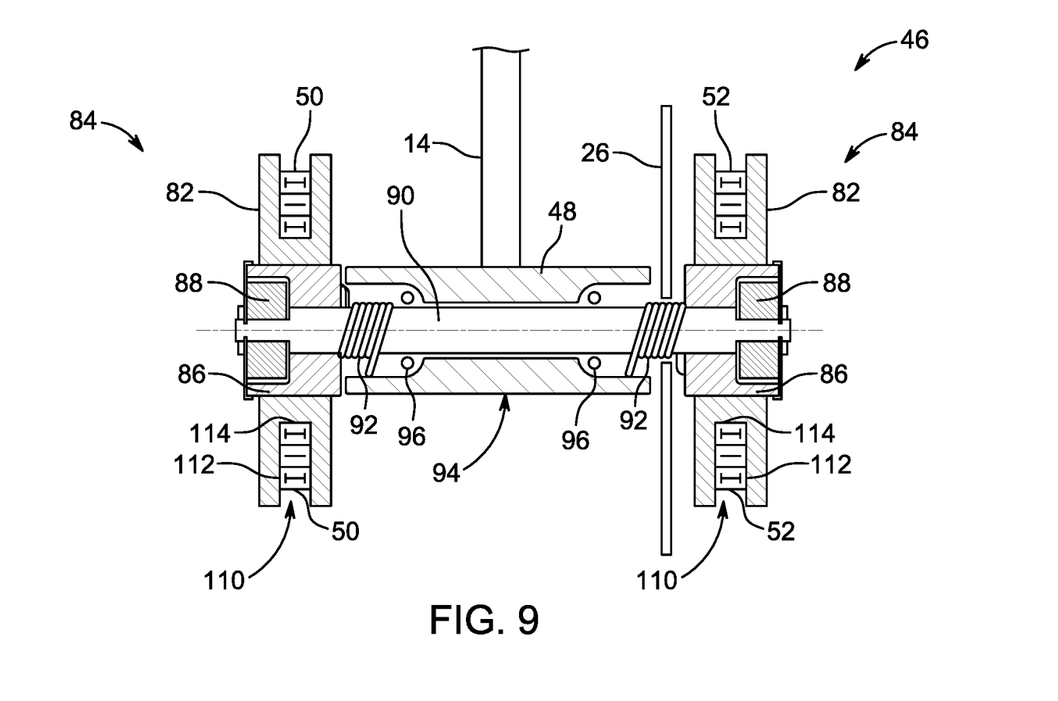
FIG. 9 is a cross-sectional view of a second embodiment of the transmission of the present invention (utilizing drums and a metal chain as a flexible power link).

In the embodiment of FIG. 9, wherein the power link 50, 52 is a metal chain, each drum 82 is provided with a deep groove 110 having a width the same as or only slightly larger than the width of the power link 50, 52, and a flat bottom surface 112. As such, the power link 50, 52 is forced by the inner wall 114 of the groove 110 to coil vertically in the groove 110. The end of the power link 50, 52 is fixed to the drum 82 at a bottom of the groove 110. As in the embodiment of FIG. 8, this vertical coiling of the power link 50, 52 enables the variability in the force conversion discussed above with reference to FIGS. 5-7.

Figure 10:
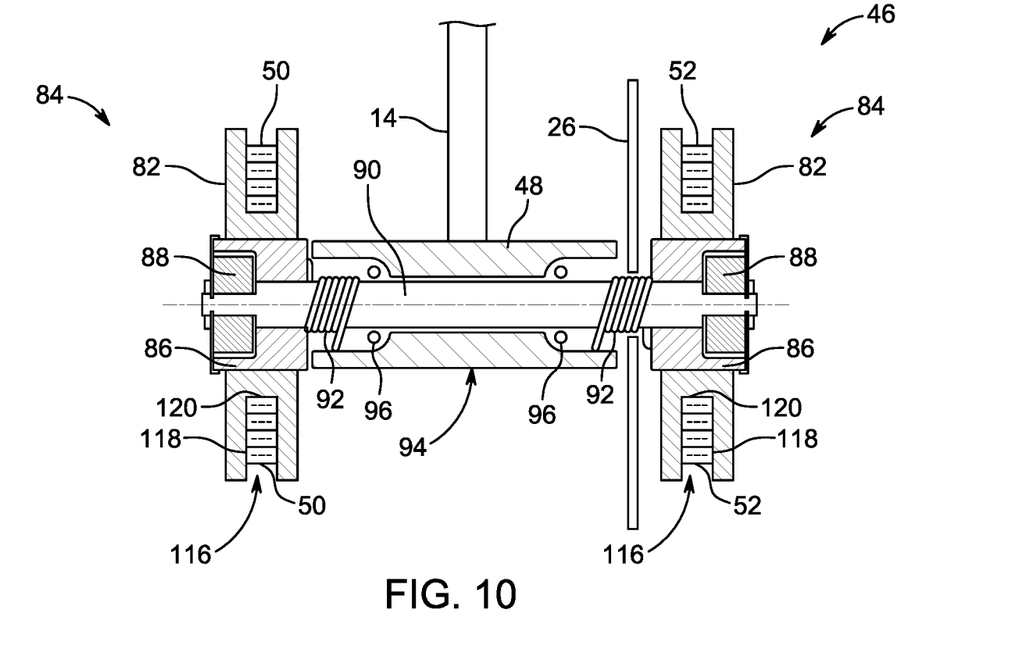
FIG. 10 is a cross-sectional view of a third embodiment of the transmission of the present invention (utilizing drums and a belt as a flexible power link).

In the embodiment of FIG. 10, wherein the power link 50, 52 is a belt, the drum 82 is provided with a deep groove 116 having a width the same as or only slightly larger than the width of the power link 50, 52, and a flat bottom surface 118. As such, the power link 50, 52 is forced by the inner wall 120 of the groove 116 to coil vertically in the groove 116. The end of the power link 50, 52 is fixed to the drum 82 at a bottom of the groove 116. As in the embodiment of FIG. 8, this vertical coiling of the power link 50, 52 enables the variability in the force conversion discussed above with reference to FIGS. 5-7.

Figure 11:
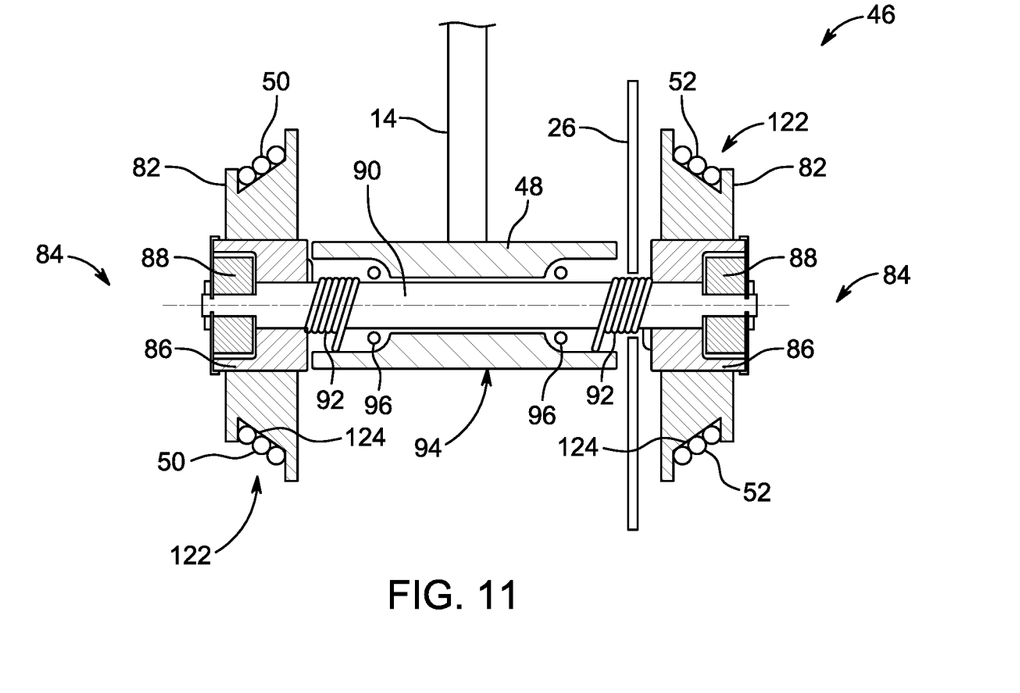
FIG. 11 is a cross-sectional view of a fourth embodiment of the transmission of the present invention (utilizing drums and a vinyl-coated metal cord as a flexible power link).

FIG. 11 shows a variation of the drum 82 wherein instead of a groove in which the power link 50, 52 is coiled, a partial vertical coiling of the power link 50, 52 is obtained by means of a channel 122 having a sloped lower surface 124. The sloped lower surface 124 means that one axial end of the surface (the end closest to the frame 14 in the illustrated embodiment) has a larger diameter than the other axial end (the end farthest from the frame 14 in the illustrated embodiment). An oppositely sloped lower surface can also be used, other than that as shown. The end of the power link 50, 52 is attached to the drum 82 at a location at the shortest diameter of the channel 122 to urge the power link 50, 52 to start its coiling at the shortest diameter part of the channel 122. The power link 50, 52 then coils upward along the lower surface 124. The same effect is provided by the sloped lower surface 124 as is provided by the vertical coiling of the power link 50, 52 in the grooves 104, 110, 116, i.e., causing different vertical starting points of the engagement of the power link 50, 52 to the drum 82 dependent on the length of the power link 50, 52 along the pedal slider 36, 38.

When the length of the power link 50, 52 along the pedal slider 36, 38 is at a maximum (see FIG. 7), the amount of the power link 50, 52 present in the channel 122 will be minimal and the power link 50, 52 first engaging with the drum 82 at a location closest to the lower end of the channel 122 thereby causing each forward stroke of the power link 50, 52 to have a maximum force. By contrast, when the length of the power link 50, 52 along the pedal slider 36, 38 is at a minimum (see FIG. 5), the amount of the power link 50, 52 present in the channel 122 will be maximal and the power link 50, 52 first engaging with the drum 82 at a location farthest from the lower end of the channel 122 thereby causing each forward stroke of the power link 50, 52 to have a minimum force.

Generally, the variations depicted in FIGS. 8-11 serve to cause the point at which the power link 50, 52 first engages with the drum 82 to vary in a vertical direction, i.e., vary in a radial direction to be at different radii from a center of the drum 82. A difference in the radial distance from the center of the drum 82 changes the parameters of the rotational force being generated by the pulling of the power link 50, 52. When the radial distance is the shortest, the most rotational force is generated by the pulling of the power link 50, 52, and conversely, when the radial distance is the largest, the least rotational force is generated by the pulling of the power link 50, 52.

Accordingly, the constructional variations in the drum 82 constitute force adjusting means that adjust the conversion of the pulling force via the power links 50, 52 to rotational force by varying the vertical distance at which the power link 50, 52 coils around the drum 82. This variation in the vertical distance is not present in an earlier bicycle disclosed in US 20150076787 wherein the drums 33(a), 33(b) have a groove with a horizontal lower surface and retain a power link 20 at the same vertical distance from the center of the drum 33(a), 33(b), see FIG. 5.

Figure 12:
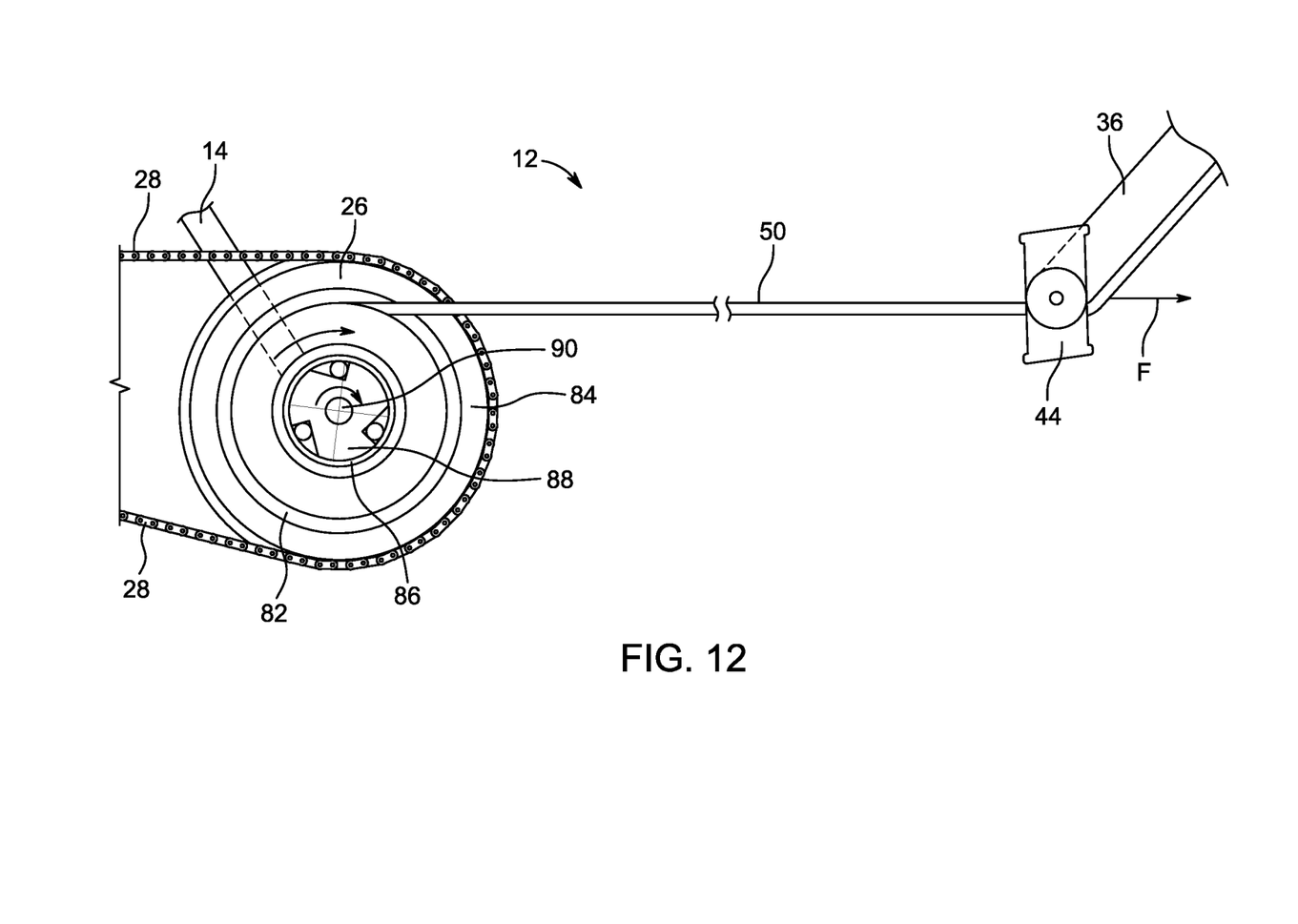
FIG. 12 is a side view of the first embodiment of the transmission and linear drive mechanism of the present invention (utilizing drums and a vinyl-coated metal cord as a flexible power link).

FIG. 12 is a view of the drive mechanism 12 on the right side of the bicycle 10, with the vinyl-coated metal cord as the power link 50, 52 (see FIG. 2). The drive mechanism 12 on the left side of the bicycle 10 is a mirror image. In FIG. 12, it can be seen that the power link 50 extends along the pedal slider 36. The motive force exerted by the rider to the pedal 44 is in the direction of arrow F and by virtue of the portion 56 of the power link 50 being in a horizontal plane forward of the roller 60 (not shown), is substantially horizontal.

Figure 13:
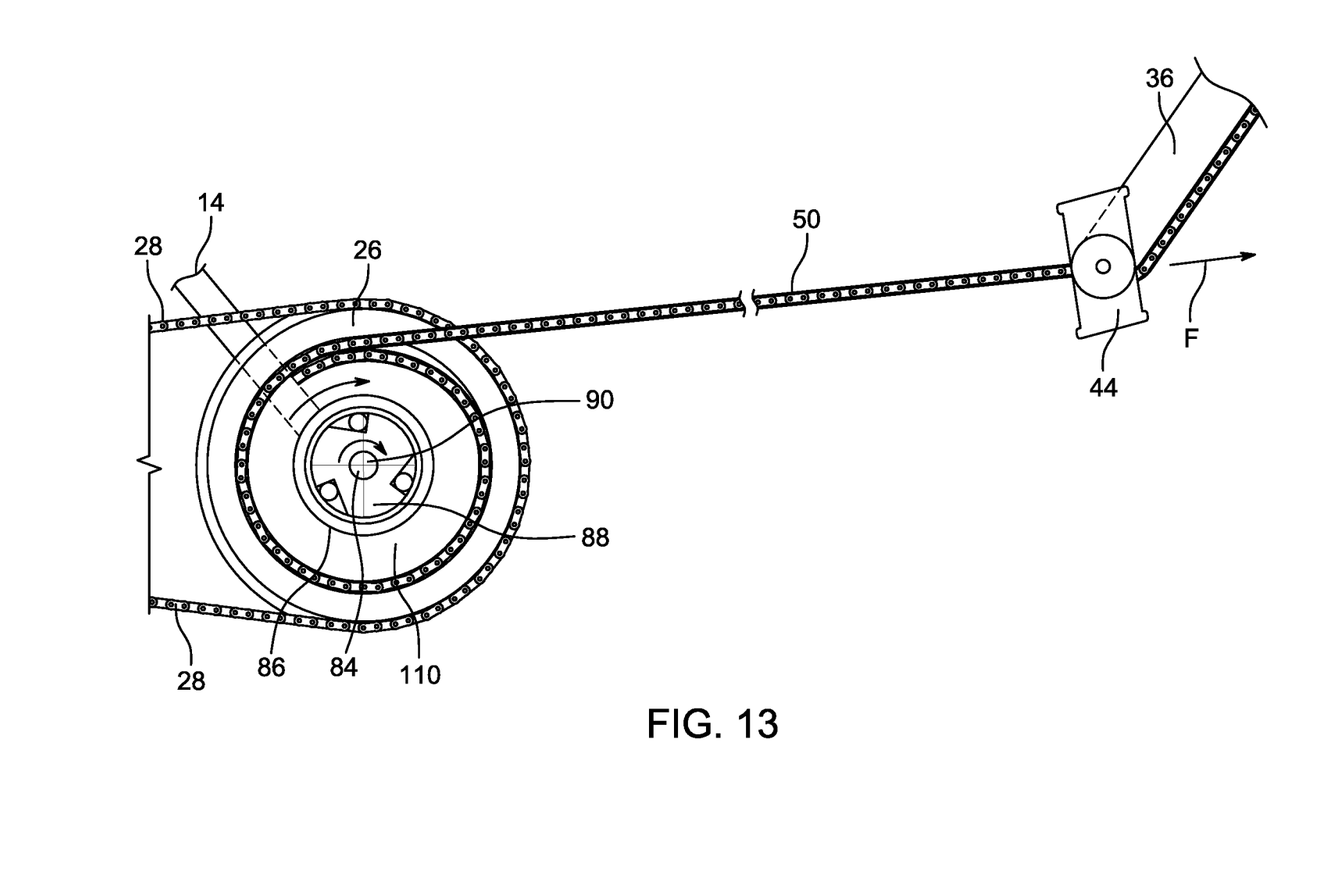
FIG. 13 is a side view of the second embodiment of the transmission and linear drive mechanism of the present invention (utilizing drums and a metal chain as a flexible power link).

FIG. 13 is a view of the drive mechanism 12 on the right side of the bicycle 10, with the metal chain as the power link 50, 52 (see FIG. 3). In other respects, FIG. 13 is similar to FIG. 12.

Figure 14:
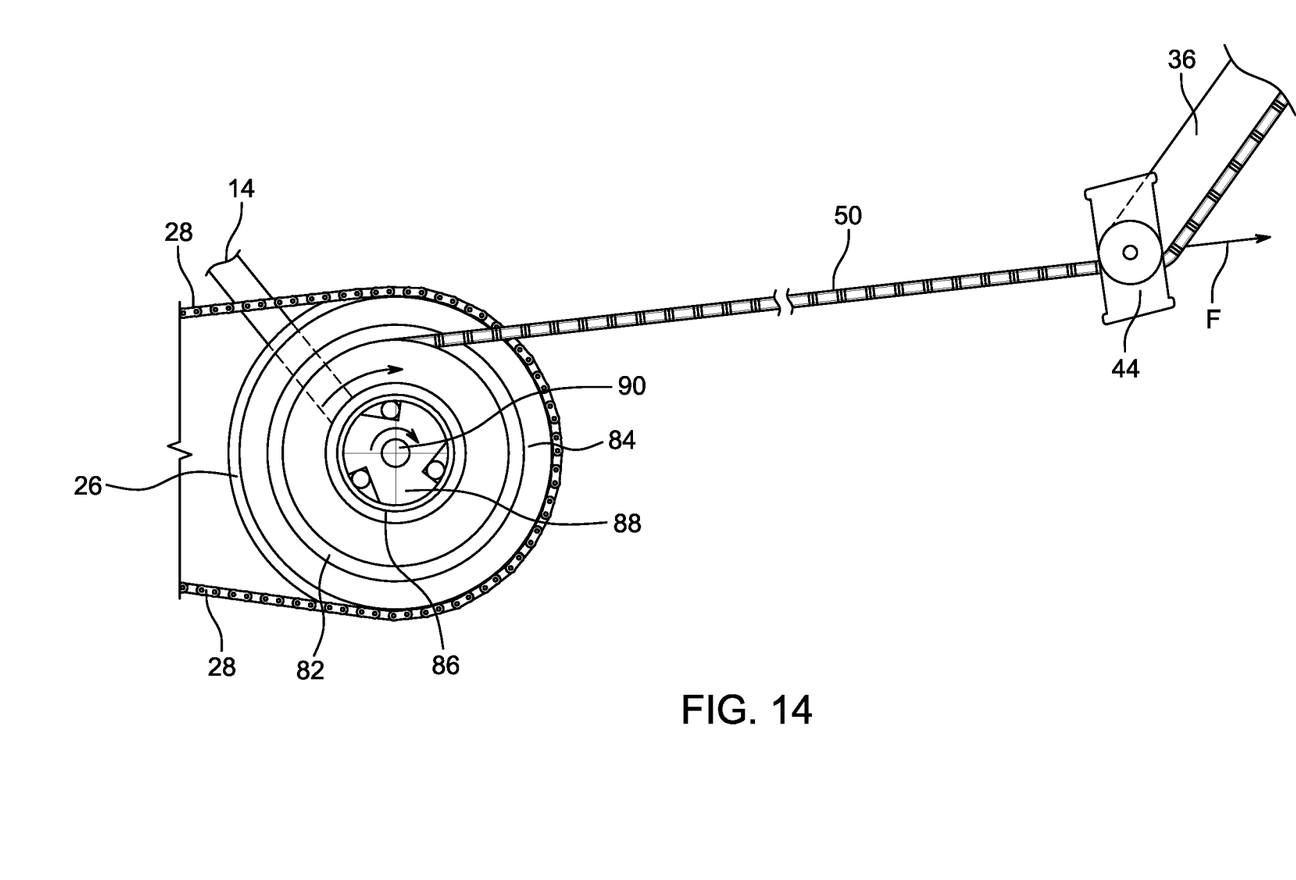
FIG. 14 is a side view of the third embodiment of the transmission and linear drive mechanism of the present invention (utilizing drums and a belt as a flexible power link).

FIG. 14 is a view of the drive mechanism 12 on the right side of the bicycle 10, with the belt as the power link 50, 52 (see FIG. 4). In other respects, FIG. 14 is similar to FIG. 12.

FIG. 15 shows an embodiment wherein the pedal sliders 36, 38 are adjustable by moving the bracket holder 42. In this embodiment, instead of the bracket holder 42 fixed to the frame 14, the adjustable system includes an adjustable member 128 is attached to the frame 14, a rotatable bearing 130 is attached to the adjustable member 128 and a support member 126 is attached to the bearing 130 and to the pedal slider bracket 40. This construction can be used in any of the embodiments disclosed in this application.

Adjustable member 128 can have a first part fixed to the frame 14 and a second part movable relative to the first part. This type of cooperating arrangement may be, for example, any type of telescoping arrangement of two parts or members, possibly with a push button in one part and apertures in an axial direction in the other part to selectively receive the push button at a desired one of a plurality of different lengths of the member 128. Any known type of adjustable member may be used as member 128, whether a single part or multiple parts, with the sole criteria being to have one end fixed to the frame 14 and the other end movable to a variable distance from the frame 14.

With the adjustability of the member 128, the bearing 130 is movable in the direction of the arrows to variable distances relative to the frame 14. The support member 126 is then adjusted by pivoting it about the bearing 130 to position the pedal slider bracket 40 at a comfortable position for the rider to push the pedals 44 attached to the pedal sliders 36, 38 retained at their upper ends by the pedal slider bracket 40. It thus becomes possible to adjust the pivot axis about which the pedal sliders 36, 38 swing by moving the members 126, 128, to a desired position tailored to the rider of the vehicle 10 sitting in the seat 54.

As a consequence of providing the adjustable member 128 as two separable parts, it becomes possible to remove the pedal slider bracket 40 and pedal sliders 36, 38 from the frame 14, e.g., for storage purposes. In this scenario, the power links 50, 52 are separated from the pedal sliders 36, 38 while the pedal sliders 36, 38 and pedal slider bracket 40 is removed from the frame 14 via separation of the member 128 into two parts. The unit of one part of the member 128, the bearing 130, the support member 126, the pedal slider bracket 40 and the pedal sliders 36, 38 is then stored with the remaining unit of the bicycle 10. The power links 50, 52 can be retained by attaching each to a hook 132 or some other comparable type of holder that is attached to the frame 14. The power links 50, 52 are urged to coil around the drums 82 by the springs 92, so it is worthwhile to retain the front end region of the power links 50, 52 via the hooks 132 to enable easy reassembly of the bicycle 10.

The torsion and linear springs used in this invention may be made of any suitable material allowing for a spring-like action, such as, for example, metal, rubber or plastic. Likewise, the vehicle of the present invention may be constructed out of typical materials used for bicycles, tricycles and other human-powered vehicles, including metal, plastic, rubber, fiberglass, and wood and wood composite materials. The inventive vehicle is not limited to a bicycle as shown but may be any vehicle is one or more wheels, including a unicycle, a tricycle, a quadricycle or party bike, and the like. One or more wheels may be coupled to the drive mechanism, and one or more other wheel may be coupled to the steering mechanism.

An important aspect of the invention is that when the rider sits, the rider pushes their feet outward and backward in a linear manner to propel the bicycle 10. The rider does not perform a cyclical motion with their feet or hands. In this regard, it is possible to configure the bicycle 10 to be hand-actuated, and the claimed embodiment is not limited to foot-actuation.

Although certain figures shown herein describe a bicycle, the linear drive mechanism connected by a flexible power link to a double overrunning clutch transmission with returning springs may be utilized on various recumbent human-powered vehicles such as tricycles, four-wheeled vehicles for carrying larger loads and passengers and other multi-wheel variants.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A vehicle, comprising:
a frame;
a seat for receiving a rider of the vehicle;
a wheel attached to said frame;
a wheel drive sprocket arranged in connection with said wheel;
a main drive sprocket on said frame;
a transmission member that couples said wheel drive sprocket to said main drive sprocket;
a first pedal slider in front of said seat on one side of said frame and coupled to said frame to swing forward and rearward;
a drive mechanism including an overrunning clutch system connected to said main drive sprocket; and
a first power link connected at a first end region to said first pedal slider and at a second end region opposite to said first end region to said overrunning clutch system, forward movement of said first pedal slider causing movement of said first power link and rotation of said overrunning clutch system which causes movement of said main drive sprocket and thus said wheel drive sprocket via said transmission member causing rotation of said wheel; and said overrunning clutch system including
a first ring;
a second ring configured such that rotation of said first ring in a first direction causes rotation of said second ring while rotation of said first ring in a second, opposite direction does not cause rotation of said second ring, said second ring being motively coupled to said transmission member such that rotation of said second ring causes movement of said main drive sprocket and results in rotation of said wheel; and
a drum fixed to said first ring, said second end region of said first power link being connected to said drum, said drum including a groove, said first power link being retained in said groove.

2. The vehicle of claim 1, wherein said groove is dimensioned to cause said first power link to coil over itself in said groove.

3. The vehicle of claim 1, further comprising a pedal slider bracket to which an upper end of said first pedal slider is attached.

4. The vehicle of claim 3, further comprising:
a pedal slider bracket holder connected to said frame and that retains said first pedal slider bracket in connection with said frame; and
an adjustable system that enables a position of said pedal slider bracket relative to said frame to be adjustable.

5. The vehicle of claim 4, wherein said adjustable system comprises a first part attached to said frame, a second part movable relative to said first part to provide different lengths of an assembly of said first and second parts, a support member attached to said pedal slider bracket holder, and a bearing that connects said second part to said support member.

6. The vehicle of claim 3, wherein said first power link is attachable to said first pedal slider at a plurality of different heights relative to a bottom of said first pedal slider.

7. The vehicle of claim 6, further comprising a clamp or fixator, said first power link being attachable to said first pedal slider at the plurality of different heights relative to the bottom of said first pedal slider by said clamp or fixator.

8. The vehicle of claim 6, further comprising:
a pedal slider bracket to which an upper end of said first pedal slider is attached; and
an adjustable system that enables a position of said pedal slider bracket relative to said frame to be adjustable.

9. The vehicle of claim 1, wherein said overrunning clutch system further comprises a transmission axle to which said second ring is fixed, said main drive sprocket being fixed to said transmission axle, said transmission member passing around an outer periphery of said main drive sprocket.

10. The vehicle of claim 9, wherein said overrunning clutch system further comprises at least one biasing member that biases said first ring to rotate in the second direction.

11. The vehicle of claim 10, wherein said at least one biasing member is arranged in connection with said transmission axle.

12. The vehicle of claim 1, wherein said overrunning clutch system further comprises at least one biasing member that biases said first ring to rotate in the second direction, said at least one biasing member being arranged in connection with said transmission axle.

13. The vehicle of claim 1, further comprising:
a second pedal slider arranged in front of said seat on an opposite side of said frame than the side on which said first pedal slider is arranged, said second pedal slider being coupled to said frame to swing forward and rearward, said clutch system further comprising a second overrunning clutch connected to said main drive sprocket; and
a second power link connected at a first end region to said second pedal slider and at a second end region opposite to said first end region of said second power link to said second overrunning clutch, forward movement of said second pedal slider causing movement of said second power link and rotation of said second overrunning clutch which causes movement of said main drive sprocket and thus said wheel drive sprocket via said transmission member causing rotation of said wheel,
said second overrunning clutch including
a first ring;
a second ring configured such that rotation of said first ring of said second overrunning clutch in the first direction causes rotation of said second ring of said second overrunning clutch while rotation of said first ring of said second overrunning clutch in the second direction does not cause rotation of said second ring of said second overrunning clutch, said second ring of said second overrunning clutch being motively coupled to said transmission member such that rotation of said second ring of said second overrunning clutch causes movement of said main drive sprocket and results in rotation of said wheel; and
a drum fixed to said first ring of said second overrunning clutch, said second end region of said second power link being connected to said drum of said second overrunning clutch, said drum of said second overrunning clutch including a groove, said second power link coiling over itself in said groove of said second overrunning clutch.

14. The vehicle of claim 1, further comprising a roller arranged on said frame to guide said first power link in a substantially horizontal plane in a portion between said roller and said first pedal slider.

15. The vehicle of claim 14, wherein said roller is adjustably mounted to said frame.

16. The vehicle of claim 1, wherein said first ring is an outer ring and said second ring is an inner ring having a portion inward of said outer ring.

17. The vehicle of claim 1, further comprising:
a second pedal slider arranged in front of said seat on an opposite side of said frame from the side on which said first pedal slider is situated, said second pedal slider being coupled to said frame to swing forward and rearward independent of the swinging of said first pedal slider, said clutch system including a second overrunning clutch connected to said main drive sprocket; and
a second power link connected at a first end region to said second pedal slider and at a second, opposite end region to said second overrunning clutch, forward movement of said second pedal slider causing movement of said second power link and rotation of said overrunning clutch which causes movement of said main drive sprocket and thus said wheel drive sprocket via said transmission member causing rotation of said wheel.

18. The vehicle of claim 1, wherein said first power link comprises a vinyl-coated metal cord or a metal chain or a belt.

19. The vehicle of claim 1, wherein said groove is a channel having a sloped lower surface that causes said first power link to coil along said sloped lower surface.

20. The vehicle of claim 19, wherein said second end region of said first power link is attached to said drum at a location at a smallest diameter of said channel.

\* \* \* \* \*